United States Patent [19]

Tamada et al.

[11] Patent Number: 5,124,920
[45] Date of Patent: Jun. 23, 1992

[54] DRIVER RESTRICTION APPARATUS FOR RESTRICTING A VEHICLE DRIVER

[75] Inventors: Masuo Tamada, Yokohama; Seinosuke Kajitani, Sagamihara, both of Japan

[73] Assignee: Kabushiki Kaisha Toshiba, Kawasaki, Japan

[21] Appl. No.: 511,769

[22] Filed: Apr. 20, 1990

[30] Foreign Application Priority Data

Apr. 20, 1989 [JP] Japan .................. 1-100530
Apr. 20, 1989 [JP] Japan .................. 1-100531

[51] Int. Cl.⁵ .............................................. G06F 15/20
[52] U.S. Cl. .......................... 364/424.05; 364/424.01; 235/382.5
[58] Field of Search ........... 364/424.05, 424.01; 235/382, 382.5; 340/457, 825.31, 825.32

[56] References Cited

U.S. PATENT DOCUMENTS

| | | | |
|---|---|---|---|
| 3,665,397 | 5/1972 | Di Napoli et al. | 340/825.33 |
| 4,204,255 | 5/1980 | Cremer | 364/424.05 |
| 4,327,353 | 4/1982 | Beard et al. | 235/382 |
| 4,477,874 | 10/1984 | Ikuta et al. | 364/424.05 |
| 4,588,175 | 12/1985 | Genest et al. | 235/382 X |
| 4,614,862 | 9/1986 | Fisermann | 235/382.5 |
| 4,893,240 | 1/1990 | Karkouti | 364/424.05 |

FOREIGN PATENT DOCUMENTS

| | | |
|---|---|---|
| 0162171 | 11/1985 | European Pat. Off. |
| 0152678 | 3/1988 | European Pat. Off. |
| 2403914 | 4/1979 | France. |
| 2451848 | 10/1980 | France. |
| 2568834 | 2/1986 | France. |
| PCT/US80/00051 | 1/1980 | PCT Int'l Appl. |
| PCT/DE84/00053 | 3/1984 | PCT Int'l Appl. |
| PCT/JP88/00330 | 3/1988 | PCT Int'l Appl. |
| 2051442 | 1/1981 | United Kingdom. |
| 2136053 | 9/1984 | United Kingdom. |

Primary Examiner—Thomas G. Black
Attorney, Agent, or Firm—Cushman, Darby & Cushman

[57] ABSTRACT

A memory stores the same information as that stored in an electronic license and a readout section reads out the license information by the electronic license. A control section determines whether or not the electronic license is the same as that owned by the owner, with the use of the information read out of the electronic license. In the case where the electronic license is the same as that of the vehicle owner, the license information or information such as the name of a person granted to use the owner's vehicle, if being entered from a keyboard, is stored in the memory. Upon the entering of the license information into a present device via a keyboard, a control unit compares the entered license information with grant information for granting the use of the owner's vehicle which is stored in the memory. If there occurs a coincidence, a key-lock section unlocks a steering wheel so that the authorized person can drive an engine by an engine control unit.

14 Claims, 6 Drawing Sheets

|  | OWNER | LICENSE NUMBER Mo | CODE NUMBER Co |
|---|---|---|---|
| LI | ADDRESS | | |
|  | NAME | BIRTH DATE | |
|  | DOMICILE | | |
| EPI | AUTHORIZED PERSON 01 | LICENSE NUMBER M1 | |
|  | AUTHORIZED PERSON 02 | LICENSE NUMBER M2 | |
|  | ⋮ | ⋮ | ⋮ |
|  | AUTHORIZED PERSON 0n | LICENSE NUMBER Mn | |
| PI | AUTHORIZED PERSON 11 | COMPANY NAME | LENT PERIOD |
|  | AUTHORIZED PERSON 12 | COMPANY NAME | LENT PERIOD |
|  | ⋮ | ⋮ | ⋮ |
|  | AUTHORIZED PERSON 1n | COMPANY NAME | LENT PERIOD |
| EHI | LICENSE NUMBER M1 | START TIME $TS_1$ | END TIME $TE_1$ |
|  | LICENSE NUMBER M2 | START TIME $TS_2$ | END TIME $TE_2$ |
|  | ⋮ | ⋮ | ⋮ |
|  | LICENSE NUMBER Mn | START TIME $TS_n$ | END TIME $TE_n$ |
| HI | COMPANY NAME | START TIME $TS_{11}$ | END TIME $TE_{11}$ |
|  | COMPANY NAME | START TIME $TS_{12}$ | END TIME $TE_{12}$ |
|  | ⋮ | ⋮ | ⋮ |
|  | COMPANY NAME | START TIME $TS_{1n}$ | END TIME $TE_{1n}$ |

F I G. 4

DRIVER RESTRICTION APPARATUS FOR RESTRICTING A VEHICLE DRIVER

BACKGROUND OF THE INVENTION

1. Field of the Invention

The present invention relates to a driver restriction apparatus for restricting vehicle operation to persons authorized by the owner with the use of an electronic driver license having an integrated circuit for storing, for example, vehicle license information.

2. Description of the Related Art

As well known, a vehicle such as an automobile can be driven by anyone, including the automobile owner, with the use of an automobile's key.

There is a recent large increase in the robbery of vehicles and in other crimes against various types of vehicles.

In order to prevent robbery of vehicles, all that is required is to prevent anyone, other than a vehicle's owner, from readily driving that vehicle. If, on the other hand, the operation of the vehicle is restricted only to the owner, then the car cannot be utilized to it's fullest extent. It is therefore desired, that anyone authorized by the true owner should be able to drive the car.

SUMMARY OF THE INVENTION

It is accordingly the object of the present invention to provide a driver restriction apparatus which can restrict the operation of a car driver only to a car owner or an authorized person or persons.

According to the present invention, there is provided a driver restriction apparatus for restricting a vehicle driver to authorized persons, which comprises:

means for identifying an owner of a vehicle;

means for allowing the owner of the vehicle to authorize a person to operate the vehicle;

first input means for inputting information to identify the authorized person, when authorization to use the vehicle is designated by the authorizing means;

means for storing the authorized person's identifying information inputted by the first input means;

second input means for the authorized person to input their identifying information; and means for granting the use of the vehicle when the authorized person's information inputted by the second input means coincides with the authorized person's identifying information stored in the storing means.

According to the present invention, information for authorizing the use of a vehicle to a person which has the car owner's permission is input to the device after the car owner has been identified and stored in memory. The person can drive the owner's vehicle when the authorization information stored in the memory coincides with the corresponding authorization information which is input by the authorized person. In this way, not only the car owner but also the authorized person or persons only can drive the vehicle and anyone, other than the aforementioned legitimate persons, cannot drive the car of interest. It is thus possible to authorize the use of a car to a number of authorized persons, while preventing a possible car robbery beforehand.

Further, the memory stores the information of the authorized persons, as history information of those who have actually driven the car of interest. It is possible to readily know the state in which the car of interest has so far been used for driving.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 illustrates stored information in a memory; and

DETAILED DESCRIPTION OF THE PREFERRED EMBODIMENTS

An apparatus according to one embodiment of the present invention will be explained below with reference to the accompanying drawings.

Figure 1A:
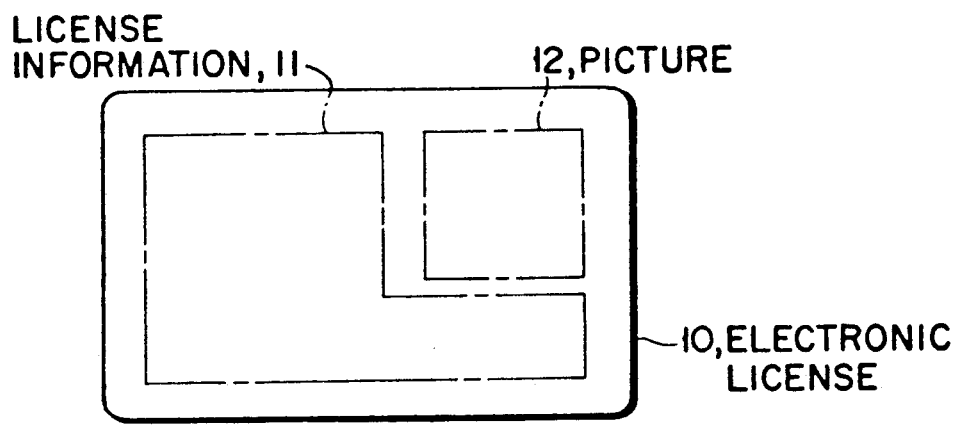
FIGS. 1A and 1B are a top view and a bottom view, respectively, showing an electronic driver license device according to an embodiment of the present invention.
Figure 1B:
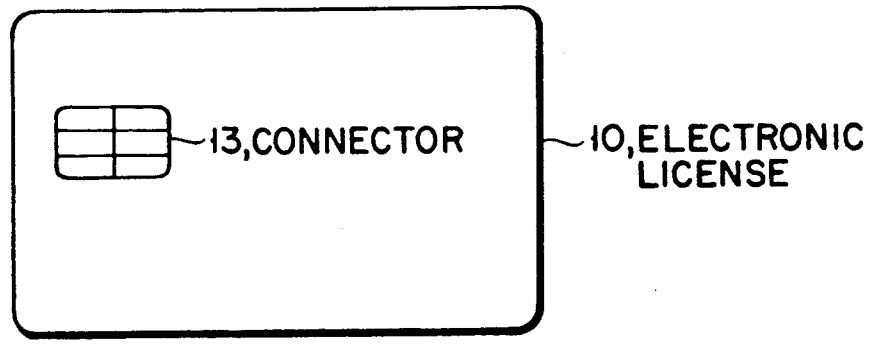

FIGS. 1A and 1B show an electronic license device 10 for a car driver which is used in the form of the so-called IC card. The electronic license device 10 displays license information 11 and an "imaged" face of a driver on the major surface, as shown in FIG. 1A, in the same way as the ordinary driver's license and a connector 13 composed of a plurality of contacts on the rear surface as shown in FIG. 1B. The electronic license device contains, for example, a memory for storing the same information as that of the license information.

Figure 2:
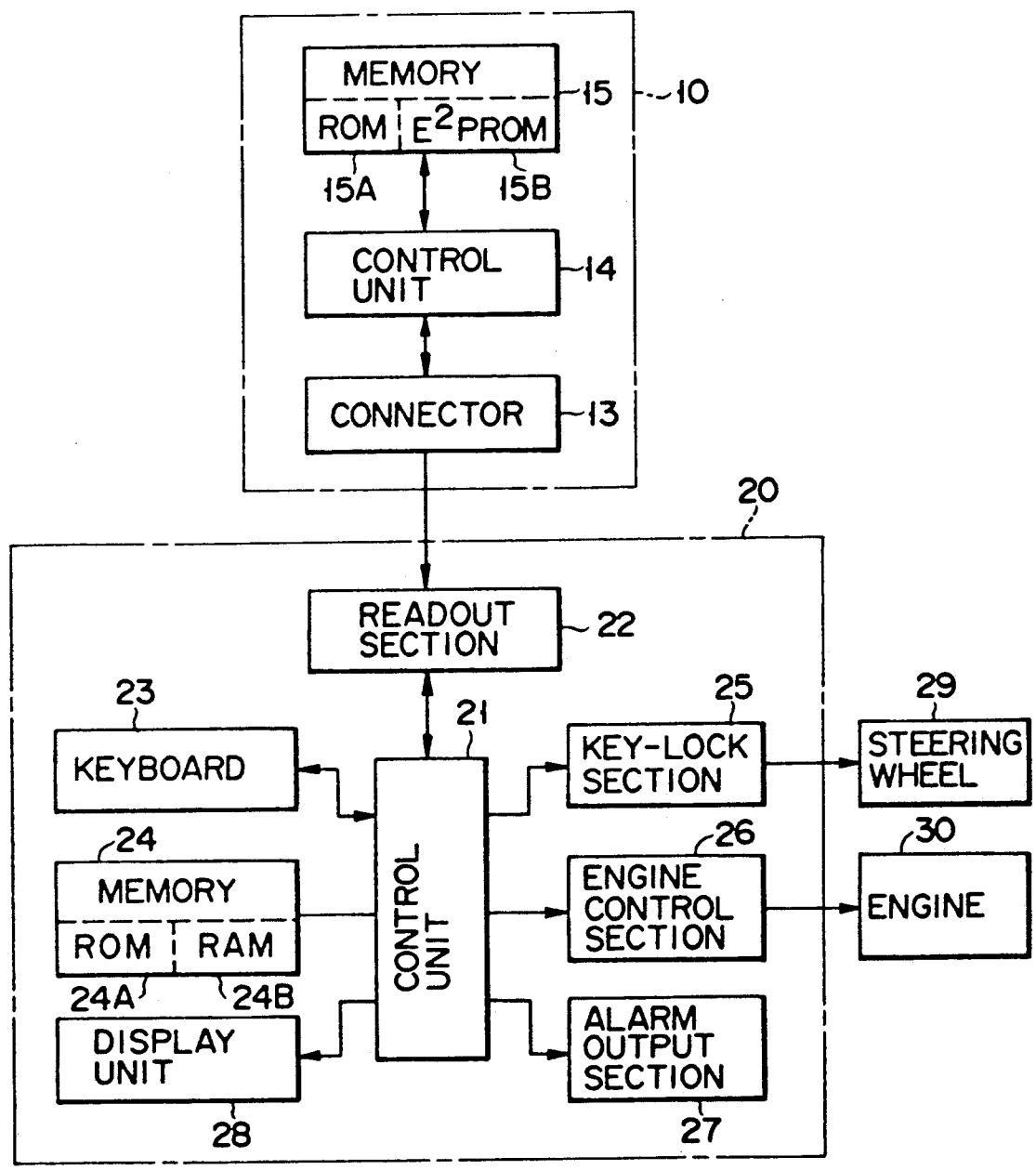
FIG. 2 is a schematic view showing the electronic license of the present invention.

FIG. 2 shows a driver restriction apparatus 20 which is placed in proper place in the interior of an automobile.

In the driver restriction apparatus 20, a readout section 22, keyboard 23, memory 24, key-lock section 25, engine control section 26, alarm output section 27 and display unit 28 are connected to a control unit 21 which is as a CPU of a microcomputer.

Figure 3:
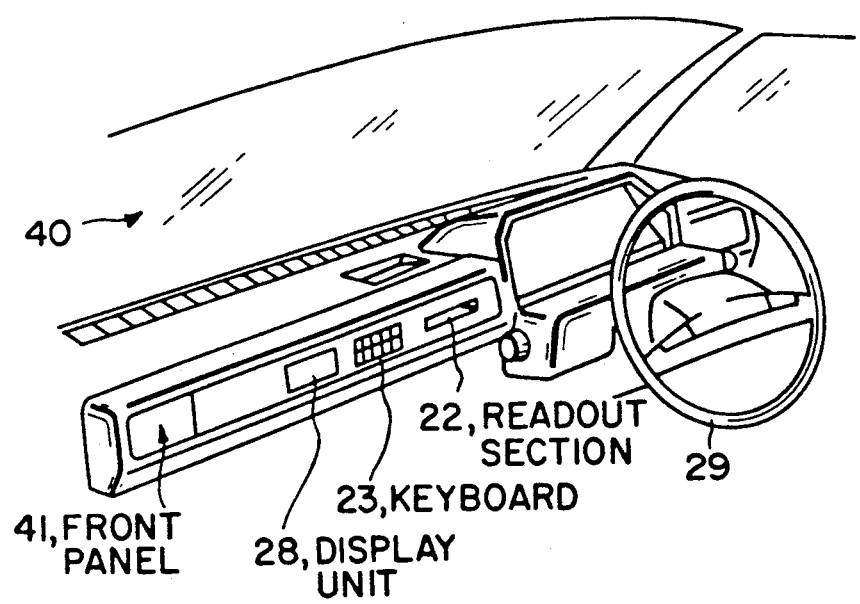
FIG. 3 illustrates an inner arrangement of a vehicle.
Figure 5A:
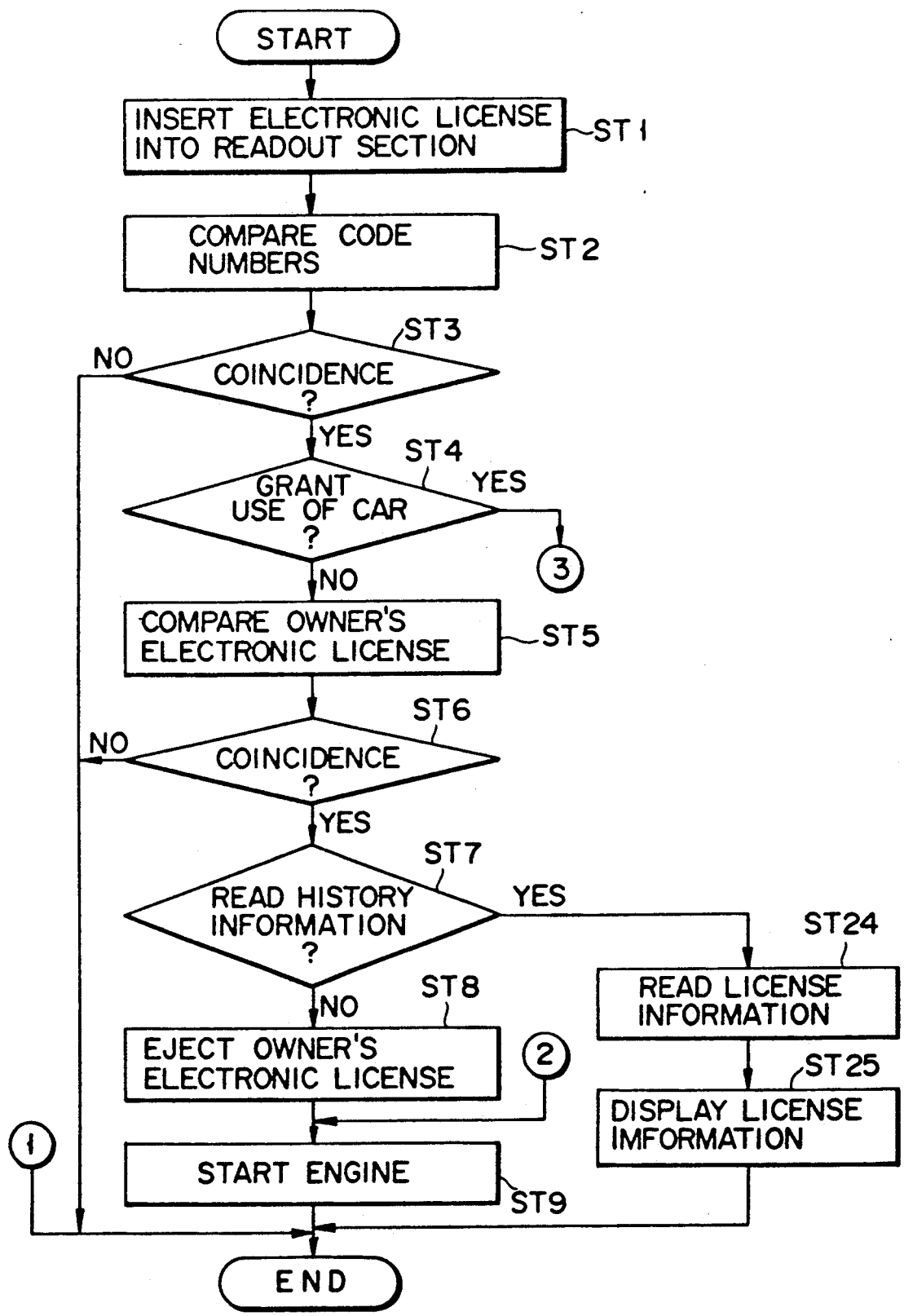
FIGS. 5A and 5B show a flowchart for explaining the operation of FIG. 2.
Figure 5B:
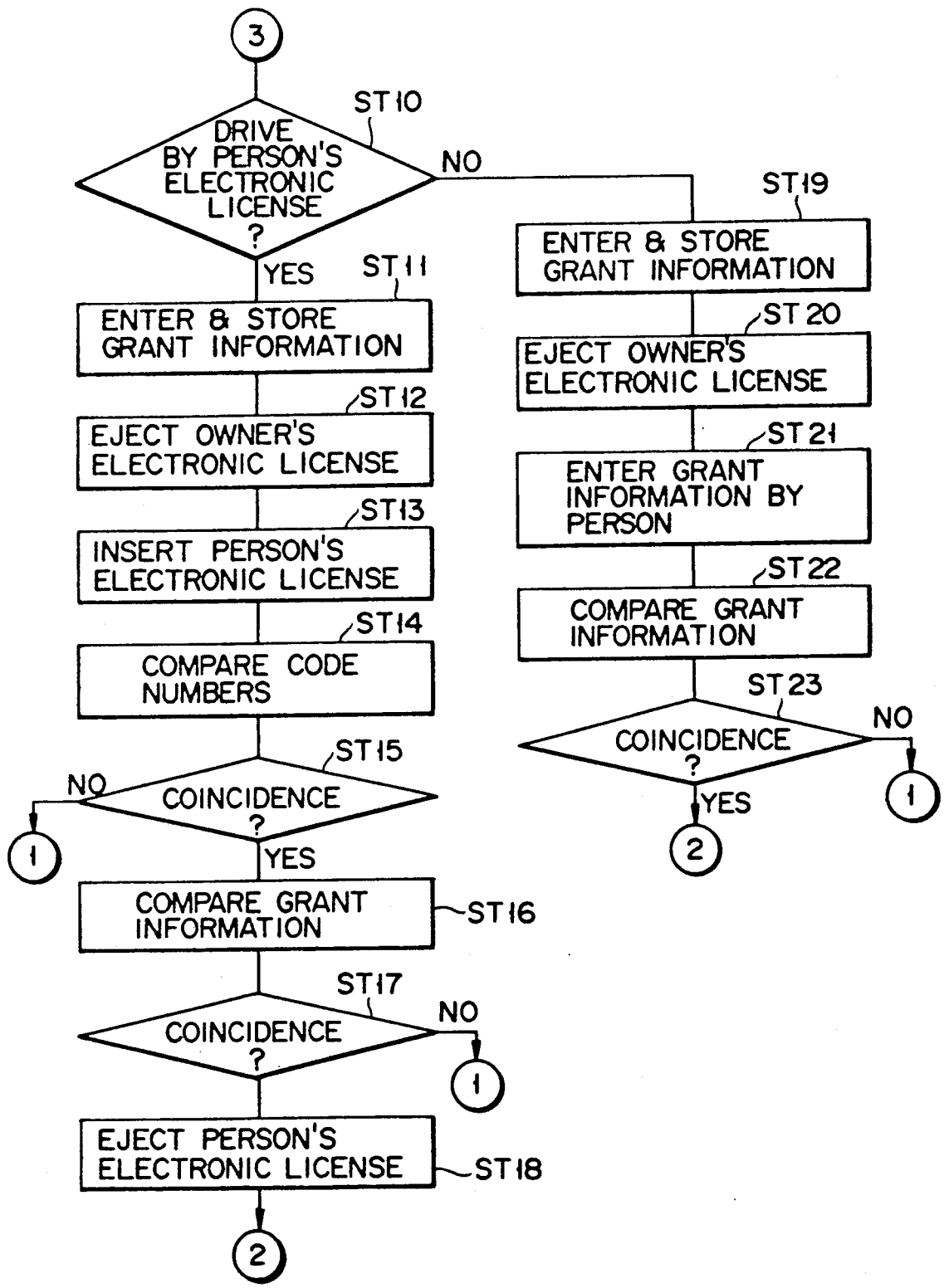

As shown in FIG. 3, for example, the readout section 22 is provided on a location in a vehicle 40, such as a front panel 41 or an outer surface of a door. The readout section 22 is composed of a known IC card readout device and reads stored information out of the electronic license device 10. The readout section 22 includes a load/unload mechanism for loading and unloading an IC card, not shown. The electronic license device 10, upon being inserted into the readout section, is automatically loaded into a proper location and, upon the completion of an information read-out operation and so on, automatically unloaded out of the readout section 22.

The electronic license device 10 includes a control unit 14 as a CPU of a microcomputer which is connected to a connector 13 and to a memory 15. The memory 15 includes a ROM 15A and E$^2$PROM 15B.

The ROM 15A stores, for example, a program for controlling an operation of the control unit 14 and the E²PROM 1B initially stores, for example, the address, name, birth date and license number of an owner, the types of licenses such as one for an ordinary-sized car or one for a large-sized vehicle and the code number of the owner.

The keyboard 23 can enter the code number and various instructions and is located, for example, in the neighborhood of the readout section 22.

The memory 24 includes, for example, a ROM 24A and RAM 24B. ROM 24A stores, for example, a program for controlling the operation of the control unit 21. RAM 24B stores, as shown in FIG. 4, information LI for a car owner's license, authorized person information EPI, PI and history information EHI, HI representing the state of a vehicle's operation.

The license information LI is composed of the address, name, birth date and license number of the owner, the code number of the owner, and so on as in the case of those stored in E²PROM of the electronic license device 10.

Person information EPI is composed of, as will be set out below, a license number, code number, and so on, of a person authorized to operate the vehicle using the person's electronic license device. Personal information PI is composed of a license number, code number, and so on, of a person authorized to operate the vehicle without utilizing the electronic license device.

History information EHI is composed of a license number, a drive start time and drive end time of a person who operated the vehicle using the person's electronic license device. History information HI is composed of a license number, drive start time and drive end time of a person who operated the vehicle without utilizing the electronic license number.

The key-lock section 25 locks or unlocks, for example, a steering wheel 29 of the vehicle under the control of the control unit 25.

The engine control unit 26 starts or stops, for example, the engine 30 of the vehicle under the control of the control unit 21.

The alarm output section 27 is composed of, for example, a buzzer and, when the control unit 21 compares the information stored in the electronic license with the information stored in RAM 24B, a result of the comparison is sent to the alarm output section. The alarm output section 27 produces an alarm sound when a noncoincidence occurs between this information.

The display section 28 is located in the neighborhood of the keyboard 23 to display information entered from the keyboard 23, various messages delivered from the control unit 21, drive history stored in RAM 24B, and so on.

Operation of the apparatus thus constructed will be explained below.

First, let it be assumed that the vehicle's owner operates his or her vehicle with the use of the electronic license device 10.

The control unit 21 normally reads out the information of the electronic license device 10 which has been inserted into the readout section 22 and is set to a determination mode for determining whether or not the owner is a legitimate one.

When, in this state, the electronic license device 10 is inserted into the readout section 22 (step ST1) and the code number of the owner is entered as input data from the keyboard 23, the entered code number data is supplied via control circuit 21, readout section 22 to the control unit 14 of the electronic license device 10 where it is compared with the code number stored in the memory 15 (steps ST2, ST3). If both the code numbers coincide with each other upon comparison/further processing is allowed to determine the use of the vehicle. (step ST4).

If, at this time, an instruction not to grant the use of the vehicle is entered from the keyboard 23, then the readout section 22 reads out the license data stored in the memory 15 in the electronic license device 10 and a comparison is made between the information of the read-out license and the information LI of the license stored in RAM 24B (steps ST5 and ST6). If both the information coincide with each other upon comparison, it is determined whether or not the history information HI is read out (step ST7). If the read-out instruction is not entered, the electronic license device 10 is discharged out of the readout section 22 (step ST8). Thereafter, the steering wheel 29 is unlocked by the key-lock section 25 and, at the same time, the engine 30 is started by the engine control section 26 so that the vehicle can be run (step ST9).

Let it be assumed that the owner of the vehicle authorizes its use to other persons. In this case, two cases may be considered: a case where the authorized person's electronic license device is employed and a case where the electronic license is not employed.

First, let it be assumed that the use of the vehicle of interest is granted to a person with the use of his or her electronic license device. In this case, the information stored in the person's electronic license device is set, as the person's identifying information EPI, in RAM 24B. This setting process is the same as those set forth above until steps ST1 to ST3.

In step ST4, control unit 21 discriminates whether or not the vehicle is lent using the authorized person's electronic license device, when it receives an instruction for authorizing the use of a vehicle of interest from the keyboard 23 (step ST10).

Upon the entering into the readout section 22 of an instruction for authorizing the use of the vehicle through the keyboard 23, a mode to authorize the use of the vehicle using the electronic license device is entered. If, in this state, the person's name 01, license number M1, and so on are entered into the readout section 22 via the keyboard 23 of the device, then the corresponding information are stored as the information EPI of the person 01 into RAM 24B (step ST11) and the owner's electronic license device is ejected out of the readout section 22 (step ST12).

When the electronic license device of the person 01 is inserted into the readout section 22 with the information EPI of the person 01 set (step ST13) and the person 01 enters his or her code number in the memory 15 of the electronic license device via the keyboard 23, then the code number is compared with the code number stored in the memory 15 of the electronic license device (steps ST14, ST15). That is, it is determined whether or not the bearer of the electronic license device is a legitimate owner. In the event of a coincidence occurring upon comparison, the license information is read out of the electronic license device of the person 01 by the readout section 22 and compared with the license information stored in RAM 24B (step ST16, ST17). That is, it is determined whether or not the bearer of the electronic license device is a legitimate person, authorized by the owner. If yes, the electronic license device of the person 01 is ejected out of the readout section 22 (step ST18). At the subsequent steps, as has already been set forth above, the steering wheel 29 is unlocked and the engine 30 is started so that the person 01 can operate the vehicle (step ST9). When the result of comparison reveals a noncoincidence, the steering wheel is held locked.

In this way, the vehicle can be operated with the use of the person's electronic license device. EPI in FIG. 4 shows that persons 01 to On using the electronic license have been registered.

When the end-of-operation information of the vehicle is entered by the keyboard or the engine is stopped, the steering wheel 29 is locked and the end-of-operation information is stored as history information in the RAM 24B.

Let it be assumed that the use of the vehicle of interest is authorized without the use of the electronic license device. In this case, the same process as set forth above is performed until the steps ST1 to 4 and step 10.

If, at step ST10, an instruction for authorizing the use of the vehicle of interest is given without the use of the person's electronic license device, another lend mode is given to the user via the keyboard 23. Upon the entry of the identifying information (e.g., the name, company name, grant period, and so on) of the authorized person into the device by the operation of the keyboard 23, in this state these information items are stored as authorization information items in RAM 24B (step ST19) and the electronic license device of the owner is ejected out of the readout section 22 (step ST20).

If the person identifying information PI authorizing the use of the vehicle of interest is not in the form of the electronic license device it is thus set in RAM 24B and, in this state, the person identifying information is entered by that person by the operation of the keyboard 13 (step ST21), then the entered person identifying information is compared with the person identifying information PI stored in RAM 24B (steps ST22, ST23). In the event of a coincidence occurring upon comparison, the steering wheel 29 is unlocked as set out above and the engine 30 is started so that the vehicle can be operated (step ST9).

By doing so, a plurality of persons can be authorized to use the vehicle without the use of the electronic license device. PI in FIG. 4 shows the state in which authorized persons 11 to 1n, not using the electronic license device, are registered in RAM 24B.

In the case where one of these persons thus registered in the state shown drives the vehicle of interest, the license number, drive start time and drive end time of the real driver are stored as history information EHI and HI in RAM 24B.

If the history information EHI and HI which are stored in RAM 24B are to be known, it is only necessary to set a history information display mode. That is, if an instruction representing the history information display mode is entered at step ST7, history information EHI and HI stored are read out of RAM 24B at step ST24 and displayed on a display unit 28. It is thus possible to recognize, from the history information, the state in which the vehicle of interest has thus far been used for driving.

In the case where a noncoincidence occurs upon comparison between the code numbers or between the license numbers, the alarm output section 27 delivers an alarm output.

Further, if the electronic license device is ejected by the alarm output section 27 out of the readout section, the alarm output section 27 delivers an alarm sound, prompting a person to withdraw the "ejected" electronic license device away from the readout section.

In order for a started engine to be stopped, for example, an extra switch may be provided so that the engine of the vehicle may be stopped.

According to the aforementioned embodiment, if a coincidence occurs upon comparison between the code numbers or between the license information items, the steering wheel 29 is unlocked so that the engine 30 can be operated. It is thus possible to prevent a robbery of the vehicle, because upon a noncoincidence between the code numbers or between the license information items the vehicle of interest cannot be operated by an unauthorized person.

The vehicle of interest can be run by an authorized person by setting the person's information items in the present device under a permission of the owner to grant the use of the vehicle of interest and entering the person identifying information items in that vehicle. Thus the vehicle can be fully utilized by a number of persons.

In the case where the vehicle is lent to the authorized person, he or she can select either one of a lend mode for authorizing the use of the vehicle authorized by the electronic license information and a lend mode for authorizing the use of the vehicle not in the form of the electronic license information. It is, therefore, possible to gain an advantage of using the vehicle in accordance with the situation under which it is placed.

The license information, company information and so on which are read out by the readout section 22 are stored in RAM 24B and held as history information there. It is, therefore, possible to readily know the state in which the vehicle has so far been used for driving.

Further, upon the start of the engine the electronic license device 10 is ejected out of the readout section 22 and the driver never fails to forget the withdrawal of the electronic license device 10 away from there.

Additional advantages and modifications will readily occur to those skilled in the art. Therefore, the invention in its broader aspects is not limited to the specific details, representative devices, and illustrated examples shown and described. Accordingly, departures may be made from such details without departing from the spirit or scope of the general inventive concept as defined by the appended claims and their equivalents.

What is claimed is:

1. A driver restriction apparatus for restricting vehicle usage to authorized persons only, which comprises:
   means, disposed in a vehicle, for identifying an owner of the vehicle;
   means, responsive to the identifying means, for allowing the owner to authorize the use of the vehicle when the owner is identified by the identifying means;
   first input means for inputting information to identify a person authorized to use the vehicle, when authorization to use the vehicle is designated by the allowing means;
   means, disposed in the vehicle, for storing the authorized person's identifying information inputted by the first input means;
   second input means for inputting information by the authorized person;
   means, disposed in the vehicle, for comparing the borrower's information inputted by the second inputting means with the identifying information stored in the storing means; and means, disposed in the vehicle, for enabling the vehicle to be driven when coincidence output is delivered from the comparing means.

2. An apparatus according to claim 1, wherein said identifying means comprises:
   second storing means for storing owner's license information;
   means for reading information stored in an electronic license device which contains information of the license; and
   second comparing means for comparing the information read out by the reading means with the information stored in the second storing means.

3. An apparatus according to claim 1, wherein said designating means further includes mode allowing means for designating a first mode for granting the use of a vehicle by said electronic license device and a second mode for granting the use of a vehicle without utilizing said electronic license device.

4. An apparatus according to claim 3, wherein said first input means includes means for inputting the person's license information stored by the electronic license device when said first mode is set by said mode designating means.

5. An apparatus according to claim 4, wherein said electronic license device comprises:
   means for electrically connecting to said reading means; and
   processing means, connected to said connecting means, for processing information input via the connecting means and output information to the reading means via the connecting means; and
   second storing means, connected to the processing means, for storing the information output from the processing means.

6. An apparatus according to claim 3, wherein said first input means includes means for inputting the person's characteristic information when said second mode is set by said mode designating means.

7. An appparatus according to claim 3, wherein said second input means includes means for inputting person's information by said person when said first and second modes are set by said mode designating means.

8. An apparatus according to claim 1, further comprising:
   means for unlocking a steering wheel in accordance with a coincidence output delivered from the comparing means.

9. An apparatus according to claim 1, further comprising:
   means for enabling the operation of an engine in accordance with a coincidence output delivered from said comparing means.

10. A driver restriction apparatus for restricting vehicle usage to authorized persons only, which comprises:
    an electronic license device for storing license information;
    first reading means for reading license information out of the electronic license device;
    means disposed in the vehicle, for granting usage of a vehicle when the license information read out by the first reading means is correct;
    means disposed in the vehicle, for storing the license information read by the first reading means as history information of a person who has been authorized to use the vehicle;
    second reading means for reading the history information out of the storing means; and
    means for displaying the history information read by the second reading means.

11. An apparatus according to claim 10, wherein said electronic license device comprises:
    means for electrically connecting to said reading means and;
    processing means, connected to said connector means, for processing information input via the connector means and output information to the reading means via the connector means; and
    second storing means, connected to the processing means, for storing information output from the processing means.

12. An apparatus according to claim 10, wherein said granting means comprises:
    means for initially storing owner's and authorized persons license information;
    means for comparing the license information read out by the first reading means with license information stored in the storing means;
    means for locking a steering wheel in accordance with a noncoincidence output delivered from the comparing means; and
    means for enabling the operation of an engine in accordance with a coincidence output delivered from the comparing means.

13. A driver restricting method for restricting vehicle usage to authorized persons only which comprises:
    identifying in the vehicle, an owner of a vehicle;
    storing in the vehicle information identifying an authorized person, when a legitimate owner is identified;
    inputting in the vehicle information concerning the authorized person by the authorized person for granting the use of the vehicle by that person; and
    granting the use of the vehicle by the person when the authorized person's information input by the vehicle owner coincides with the information which is input by the authorized person.

14. Driver restriction apparatus for restricting vehicle usage to authorized persons only, which comprises:
    an electronic license device for storing license information;
    first reading means disposed in the vehicle, for reading license information out of the electronic license device;
    means disposed on the vehicle, for granting the use of the vehicle when the license information read out by the first reading means is valid;
    first storing means for storing the license information read by the first reading means as history information of a person who uses the vehicle under the grant of the use of the vehicle;
    second reading means for reading the history information out of the first storing means;
    means for displaying the history information read by the second reading means;
    wherein said electronic license device comprises:
    means for electrically connecting to the first reading means;
    processing means connected to said connector means for processing information input by the connector means and output information to the first reading means via the connector means; and
    second storing means connected to the processing means for storing information output from the processing means;
    wherein said granting means comprises:

third storing means for initially storing owner's and authorized user's license information;

means for comparing the license information read out by the first reading means with license information stored in the third storing means;

means for locking a steering wheel in accordance with a non-coincidence output delivery from the comparing means; and means for enabling the operation of an engine in accordance with a coincidence output delivery from the comparing means.

* * * * *